April 26, 1960      F. B. D'ENIS      2,933,821
LEVELLING INSTRUMENTS
Filed Aug. 16, 1956      2 Sheets-Sheet 1
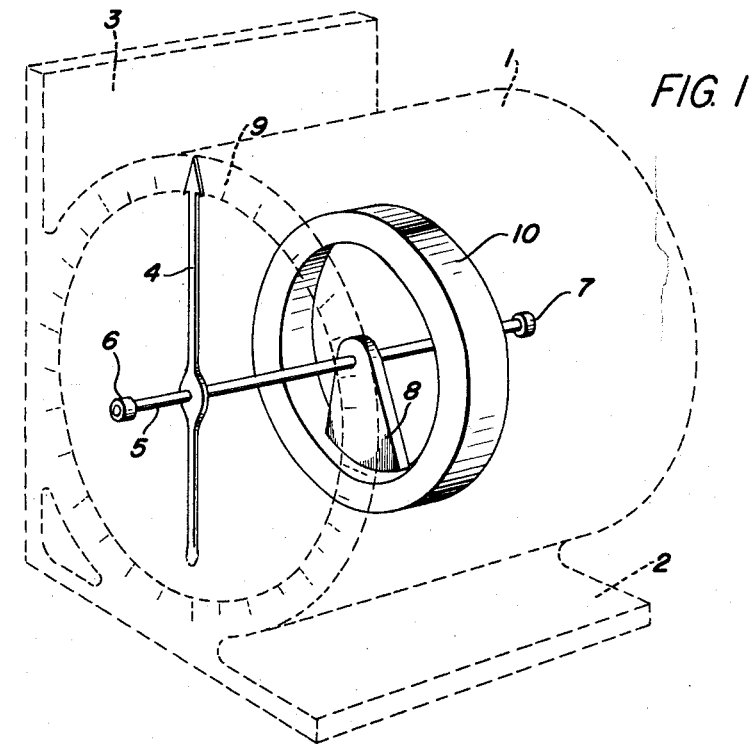
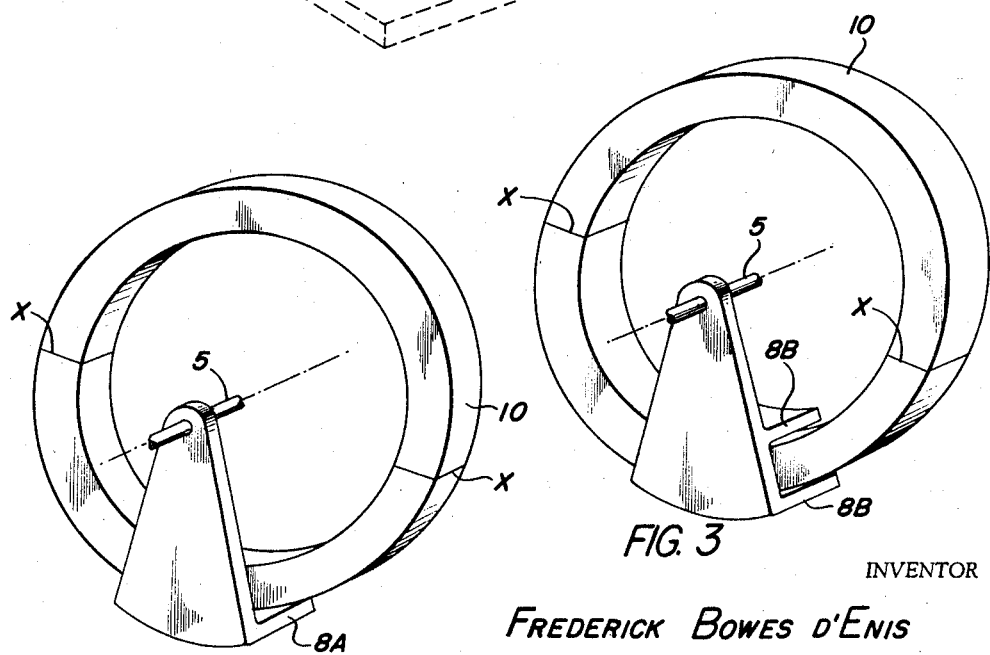
INVENTOR
FREDERICK BOWES D'ENIS
BY *William R. Liberman*
ATTORNEY April 26, 1960  F. B. D'ENIS  2,933,821
LEVELLING INSTRUMENTS
Filed Aug. 16, 1956  2 Sheets-Sheet 2

INVENTOR
FREDERICK BOWES D'ENIS
BY William R. Liberman
ATTORNEY

United States Patent Office 2,933,821
Patented Apr. 26, 1960

2,933,821

LEVELLING INSTRUMENTS

Frederick Bowes d'Enis, Mabelreign, Salisbury, Southern Rhodesia

Application August 16, 1956, Serial No. 604,464

3 Claims. (Cl. 33—220)

This invention refers to clinometers, which generally consist essentially of a vertical pointer mounted on a horizontal axis, the said pointer having a balance weight or the like affixed to it so that under the action of gravity the said pointer is maintained vertical, the main body in which the pointer is mounted carrying a conveniently graduated scale, such that when the main body is tilted from the vertical the pointer by virtue of its construction, remains vertical and so indicates the angle of tilt on the graduated scale.

Clinometers as defined above, and variants thereof in which the scale is the unbalanced element and traverses a stationary indicator, are in common use whether incorporated in straight edges whose inclination is to be measured, or otherwise, and it is a principal object of this invention to provide an improved and simplified means of damping the oscillations of the pointer or scale, as the case may be, during use of the device.

According to the invention a clinometer comprises a pair of members coaxially mounted for substantially frictionless relative rotation, whereof one presents an angular scale and the other presents a pointer or indicator cooperating with said scale to measure relative orientation between the two members, one of the said members being rotationally unbalanced and the other being comprised in a body or housing of the device which is capable of being placed at varying orientations about the common axis of the two members, a magnetic element associated with one of the members in fixed orientation thereto, a permanent magnet associated with the other member in fixed orientation thereto, the magnetic element being located within the field of the permanent magnet so as to create damping of relative rotational or oscillative movement of the two members.

The permanent magnet is conveniently of annular form and the rotational unbalance of the other member is obtained by a pendulum movable substantially in the centre of the magnetic field. The pendulum may be so devised and/or located as to move within or without the inner and outer circumferences of the permanent magnet and/or at either end or opposite ends thereof.

Referring to the accompanying drawings, whereof the first three are purely diagrammatic, in perspective:

Fig. 1 is a simple form of clinometer according to the invention;

Fig. 2 shows an alternative arrangement of internal parts of the device shown in Figure 1;

Fig. 3 shows a further alternative arrangement of the internal parts;

Figure 5:
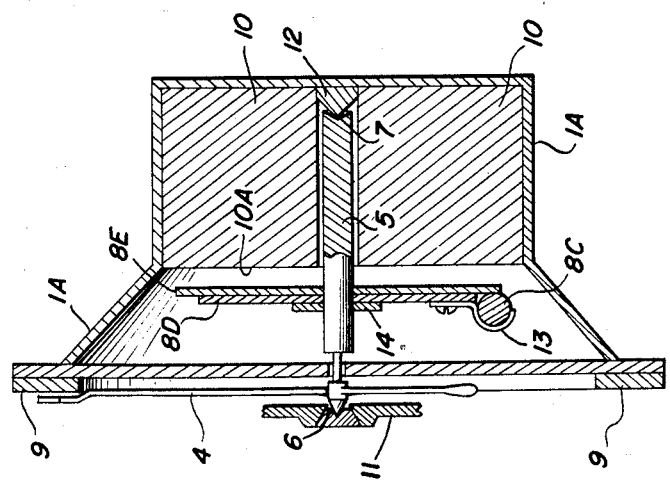

In Figure 1 the main body, in its simplest form, as shown by the broken lines, consists of a circular tubular housing 1 having one or more straight edge surfaces 2 and 3 at a tangent to the circumference of the housing, the said straight edges allowing the housing to be placed against any inclined planar surface whose inclination it is desired to measure.

The pointer 4 is mounted on a spindle 5 substantially at right angles to the pointer, and the said spindle is carried coaxially in bearings 6 and 7 suitably mounted at the front and the rear of the main housing, so that the spindle occurs at right angles to the end planes of the housing, and parallel to the planes of the straight edge surfaces 2 and 3 tangential thereto. The bearings 6 and 7 are constructed to provide minimal friction and are preferably jewelled bearings such as are found in watches.

The said spindle 5 also carries a pendulum 8 so disposed about its axis as to maintain the pointer in a vertical position under the influence of gravity, so that its position in relation to the angular scale 9, fixed in relation to the body 1, gives a measure of the inclinations of the surfaces 2 and 3.

The pendulum 8 is constructed from some magnetic material such as soft iron, steel, or any other material having suitable magnetic properties, but is not itself magnetised in any way.

The spindle 5 is so mounted in the main housing as to allow the pendulum to be placed in the centre of a magnetic field, the said magnetic field being produced by a circular or annular permanent magnet 10 fixedly mounted coaxially in the body 1.

Alternatively, as in Figure 2, the pendulum 8a may be so configured and attached to the spindle as to be situated or extend over the outside of the magnet, and rotates in the magnetic field close to the outer circumference of the magnet. In Figure 3 the configuration and arrangement of the pendulum 8b are such that the pendulum rotates partly inside and partly outside the magnet.

Alternatively, the pendulum may be constructed in two portions such as 8 and 8a suspended from the spindle so as to occur one on the inside and one on the outside of the magnet and respectively rotate close to its inner and outer circumferences.

In use, the instrument is placed, as most convenient, with either of its surfaces 2 and 3 against the surface whose inclination it is desired to measure, and the pointer 4 is allowed to come to rest in a vertical position under the influence of gravity on the pendulum. However it will be appreciated that, with the required minimum of friction in the bearings 6 and 7, in the absence of any form of damping, the pointer will oscillate for a considerable period of time before coming to absolute rest and allowing accurate readings to be obtained from the scale 9.

If however, as in the foregoing examples, the pendulum is of a magnetic material, and it is situated in the centre or other region of the coaxially arranged magnetic field, the latter exerts a magnetic drag or damping effect on the pendulum.

This damping effect, whilst being effective in damping out the oscillations of the pointer by its influence on the pendulum, does not have any effect on the final position of the pointer, as the magnetic system is symmetrical about the common pivot axis of the pointer and the pendulum and all magnetic forces acting on the pendulum to rotate it about that axis are balanced.

Figure 4:
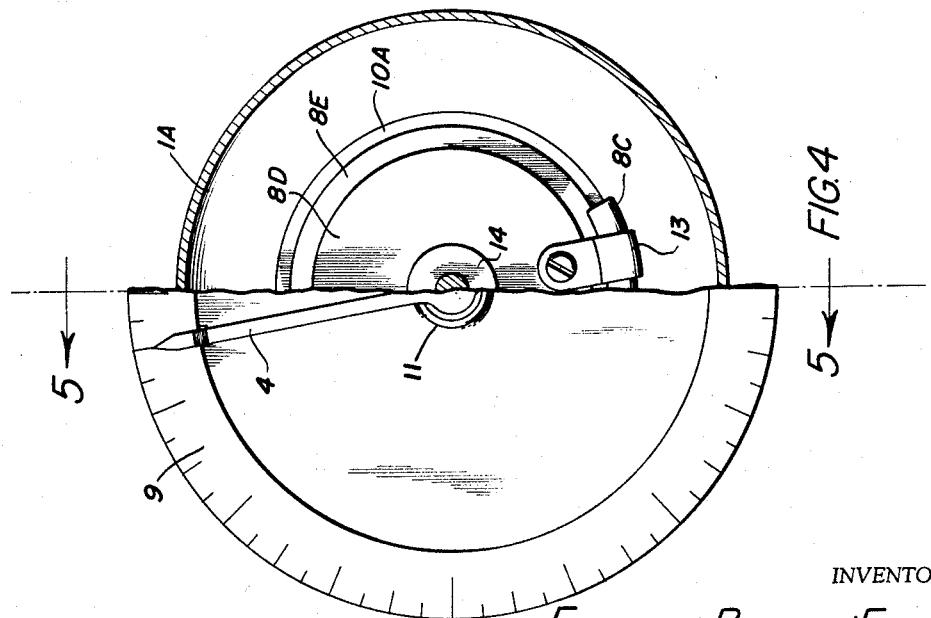
Fig. 4 is a half-sectional front elevation of a preferred construction of the improved clinometer, the half-section being taken on the line IV—IV of Fig. 5 which is an axial section on the line V—V of Figure 4.

In a convenient practical construction shown in sufficient detail in Figs. 4 and 5 and suitable for incorporation in or attachment to any body or casing (not shown) whose inclination is to be measured, the annular permanent magnet 10 is fixed in a casing 1A of non-magnetic material and of the general shape shown. The spindle 5 carrying the pointer 4 is supported coaxially with the casing and the magnet in jewel bearings at 6 and 7 supported respectively, in a front face plate or the like 11 suitably secured, with the scale 9, to the casing 1A, and in a removable cap or plug 12 carrying the pin 7 of the bearing.

The pendulum attached to the spindle 5 in this case comprises the combination of a phial or capsule 8C of mercury and a non-magnetised, magnetic metal disc 8D, the former being suitably attached to the front face of the latter as by a clip 13, and the disc in turn being fixed by any convenient means to the shaft on a flanged enlargement thereof, or the like, as at 14.

The disc 8D is thus arranged to rotate with the spindle and pointer concentrically opposite and close to the polar end face 10A of the magnet in the field thereof, for the damping effect desired.

In any of the embodiments of the invention the magnetic field may be provided by means of any suitable form of permanent magnet. For example, the magnet may be of one-piece construction, or it may be of several magnets suitably shaped so as to provide an annular magnet when juxtaposed. In preferred examples of the invention the magnet is constructed from two semi-circular magnets facing each other to form a circle or annulus, as indicated by partings at $x$ in the diagrammatic Figures 2 and 3.

Means are preferably provided in order to attain the correct adjustment of the spindle in the centre of the magnetic field in case the correct setting should be in any way disturbed, or the magnetic field is varied in any way so as not to be symmetrical. Thus, for example, although not shown in the drawings, the spindle and/or the magnet may be mounted within the casing or body 1 or 1A on eccentrics for effecting such adjustments. Furthermore, for varying the intensity or strength of the damping action means may be provided for varying the effective gap or clearance between the magnetic element and the magnet. Thus, in the construction shown in Figs. 4 and 5 the disc 8D may be replaceable by another of different thickness, or provision may be made for adding a further disc, or discs, as at 8E. Alternatively the magnet may be adjustable axially within the casing or body while the spindle bearings remain stationary.

An alternative form of the invention provides a fixed pointer which indicates the angles to be measured on a moving scale, the principles of operation and damping, however, being unaffected.

Means of any kind are preferably also provided for clamping the relatively movable parts of the device or clinometer in a stationary setting to reduce the risk of damage from shocks during transit, or otherwise when the device is not in use. Having now particularly described my said invention and in what manner the same is to be performed I declare that what I claim is:

1. An improved clinometer comprising a permanent magnetic device having a polar end face of annular configuration producing a magnetic field having an axis of symmetry substantially coinciding with the longitudinal central axis of said magnetic device, a pendulum member formed of a magnetic material located in said magnetic field and freely rotatable relative to said magnetic device about said central axis and having a center of gravity eccentric thereto whereby said member is gravity urged to a predetermined position and its oscillation damped by and relative to said magnetic field, said member being spaced a predetermined distance from said magnetic device.

2. A clinometer in accordance with claim 1, wherein said magnetic device comprises a permanent magnet of annular shape and said pendulum member carries a disc of magnetic material concentric with the longitudinal axis of said annular magnet and spaced from and in close proximity to said annular polar end face whereby to effect a substantial magnetic damping of any oscillation thereof.

3. A clinometer in accordance with claim 1, wherein said pendulum member is disposed within the inner perimeter of said annular magnetic device.

References Cited in the file of this patent

UNITED STATES PATENTS

| Re. 22,919 | McNatt | Sept. 23, 1947 |
| 546,501 | Zanger | Sept. 17, 1895 |
| 2,365,439 | Schulze | Dec. 19, 1944 |

FOREIGN PATENTS

| 331,857 | Great Britian | July 9, 1930 |